United States Patent [19]

Tomita et al.

[11] Patent Number: 4,469,349
[45] Date of Patent: Sep. 4, 1984

[54] STABILIZER

[75] Inventors: Makoto Tomita, Chiba; Tadanori Tanaka, Yachiyo; Toshikazu Ebata, Funabashi, all of Japan

[73] Assignee: Horikiri Spring Manufacturing Co., Ltd., Chiba, Japan

[21] Appl. No.: 469,026

[22] Filed: Feb. 23, 1983

[51] Int. Cl.³ .............................................. B60G 21/02
[52] U.S. Cl. ...................................... 280/665; 267/57; 280/689; 280/695; 280/721
[58] Field of Search ....................... 280/665, 96.1, 663, 280/664, 689, 695, 149, 721; 267/57, 11 R

[56] References Cited

U.S. PATENT DOCUMENTS

| 2,254,325 | 9/1941 | Slack et al. ...................... 280/665 X |
| 3,204,980 | 9/1965 | Guerriero ............................ 280/695 |
| 3,448,994 | 6/1969 | King et al. ........................... 280/689 |

FOREIGN PATENT DOCUMENTS 2058688  4/1981  United Kingdom ................. 267/57

Primary Examiner—Joseph F. Peters, Jr.
Assistant Examiner—Mitchell J. Hill
Attorney, Agent, or Firm—Ziems, Walter & Shannon

[57] ABSTRACT

A stabilizer used for vehicles and the like is formed integral with a base, shoulders on both sides of the base, and arms each formed with an eye-termination provided at the free end thereof for connecting the stabilizer to a load, said arms being each partly provided in separation from the remaining part of the stabilizer and welded to the latter at a predetermined position thereof the weld position satisfying a condition for maintaining sufficient strength of the stabilizer, to thereby produce the stabilizer more easily with a reduction in cost as well as to heighten the spring property thereof.

7 Claims, 7 Drawing Figures

STABILIZER

BACKGROUND OF THE INVENTION

The invention relates to a stabilizer to be used for vehicles and the like, and, more particularly, to a stabilizer which has arms each partly provided in separation therefrom and welded thereto to thereby provide a sufficient bend-fatigue strength as well as to produce the stabilizer more easily.

As shown in FIGS. 1 and 2, the conventional stabilizer 1 has been made of a single material member of length approximately 1.5 m to 4 m which is bent to provide a base 1a, arms 1b, and shoulders 1c with eye-terminations 1d formed at the lower ends of the arms 1b respectively. As shown in FIG. 2, each eye-termination 1d includes a through bore. In this case, in order to provide the eye-terminations 1d, it has been required to use a large sized mold, especially when the eye-terminations are forged in a mold. However the eye-terminations 1d have been generally forged while the stabilizer is securely held and, therefore, the eye-terminations 1d have not formed up with the required precision. Since the material has to be partly heated for the forging operation, it is necessary to also heat the adjacent unforged parts of the eye-terminations 1d so as to prevent the material from cracking. Further, since the stabilizer is large sized, it has been difficult to manufacture the eye-terminations 1d with the ordinary machine tools, and, therefore, the use a specific machine tool has been required. Further, due to the size of the material, the worker has been forced to expend physical energy in the production of the stabilizer.

The invention has been provided to eliminate the abovementioned defects and disadvantages of the prior art.

It is therefore a primary object of the invention to provide the arms partly separated from the stabilizer and welded thereto to thereby shorten the constituent parts of the material forming the stabilizer so as to more easily produce the stabilizer and reduce the fatigue of the worker in producing the stabilizer as well as to reduce the production cost thereof.

It is another object of the invention to heighten the manufactured precision of the stabilizer by the divided processing thereof with employment of a small sized machine tool.

It is still another object of the invention to eliminate the requirement for heating the unforged parts of the stabilizer and simultaneously to prevent the material from being cracked in the forging operation thereof.

It is still another object of the invention to properly determine the location of the welds in the stabilizer so as to heighten the bend-fatigue strength of the welds in relation to the material forming the stabilizer.

It is still another object of the invention to vary the spring property of the stabilizer by using different kinds of materials or different diameters of elements on both sides of the welds of the stabilizer to thereby heighten the riding comfort of vehicles.

The other features and advantages of the invention will be apparent from the description of the preferred embodiments in reference to the attached drawings.

DETAILED DESCRIPTION OF THE INVENTION

Figure 1:
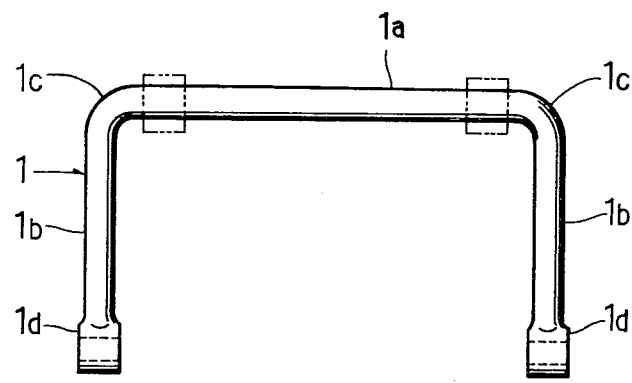
FIG. 1 is a front elevational view of a stabilizer according to prior art.
Figure 2:
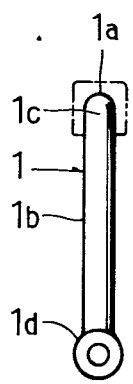
FIG. 2 is a side elevational view of the stabilizer shown in FIG. 1.

Now the invention will be described in reference to the embodiments as shown in the drawings: Particularly in reference to FIGS. 3 and 4, explanation will be given as to the result obtained from an experiment applied to a stabilizer 2, shown with a base 2a, an arm 2b, a shoulder 2c, and an eye-termination 2d together with a weld w at the arm 2b, to test the bend-fatigue strength of the weld w. The stabilizer 2 is firmly fixed at the base 2a, the shoulder 2c and the weld w thereof, and then a load has been repeatedly applied to the eye-termination 2d in such a manner that the same stress amplitude may be effected on the side of the stabilizer 2. The application of a load to the eye-terminations induces a bending stress in the arm and a torsional stress in the base. The result has been that the fatigue strength of the material forming the whole stabilizer 2 is higher than that of the weld w. In other words, the repetition number N of the load applied to the stabilizer 2 until fatigue failure is reached has been higher in the material than in the weld w.

The above-mentioned experiment was continued for the purpose of reducing the bending stress in the weld so that the breakdown of fatigue strength in the weld and the material were equivalent after a number of repetitions N of the applied load. As a result, it has been found out that the repetition number N of the load applied comes to be even at a point where a determined rate is established in relation to the bending stress $\sigma$ of the material. This relation may be explained in reference to the graph in FIG. 4. Namely, in the region where the bending stress $\sigma$ of the material is higher than the point A, the following formula is established;

$$\sigma w = 0.76\sigma + 2.5$$

In the region $\sigma = 0 \sim A$, a modification coefficient $(1 - e^{-\sigma/10})$ may be added to the abovementioned formula is established in the whole region;

$$\sigma w = 0.76\sigma + 2.5(1 - e^{-\sigma/10})$$

It has therefore been found out that the weld w may be dealt with as having the same fatigue strength as the material by providing the weld w at a position in the stabilizer 2 satisfying the following formula;

$$\sigma w \leq 0.76\sigma + 2.5(1 - e^{-\sigma/10})$$

Figure 3:
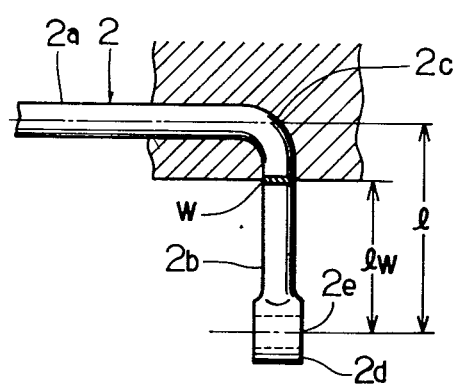
FIG. 3 is a plan view of a stabilizer according to the invention which is partly omitted to show an experiment of the bend-fatigue strength thereof by way of example.
Figure 4:
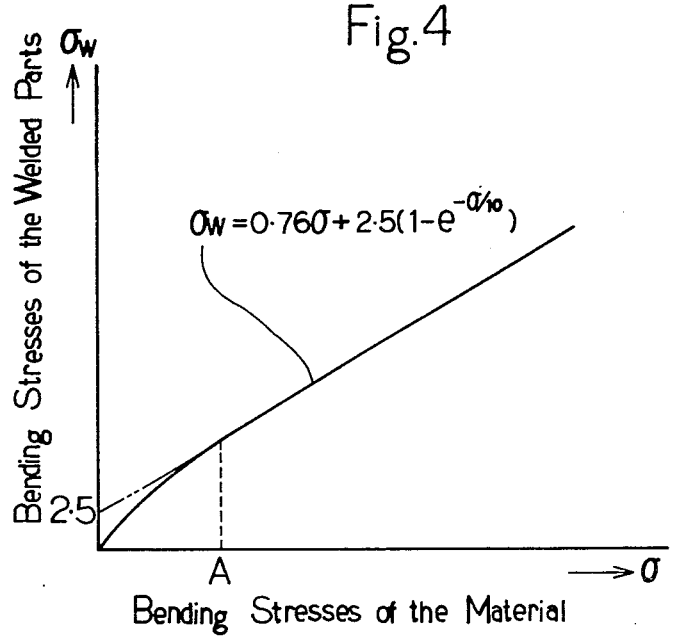
FIG. 4 is a graph representing the ratio between the bending stresses of the material and of the welds in place of the ratio between the bend-fatigue welds of the material and of the welded parts.

Now in reference to FIG. 3, the distance l is provided from the center axis of the base 2a to the center axis 2e of the eye-termination 2d, and the distance lw from the weld w to the center axis 2e of the eye-termination 2d.

Then provided that the bending stress $\sigma$ is effected at the shoulder 2c of the material and the bending stress $\sigma w$ is effected at the weld w, the following formula is established;

$$\sigma/\sigma w = l/lw$$

Accordingly in order to reduce the bending stress at the weld w, it is sufficient to shorten the distance lw defining the position of the weld w, i.e., to determine the distances l and lw in such a manner as to satisfy the following formula;

$$lw \leq 0.76l + 2.5(1 - e^{-l/10})$$

Further in consideration of the formulated relation from the view point of the practical strength of the stabilizer 2 actually used in a vehicle in reference to the practically measured data representing the repetition number of the load applied to the stabilizer 2 per unit of distance in which the vehicle runs, the weld w may be provided at the position which satisfies the following formula adopting the values on the safe side;

$$\sigma w/\sigma \leq 0.76$$

In other words, the weld w will obtain a sufficient bend-fatigue strength if the weld w is located at the stabilizer between the eye-termination 2d and a position where the ratio between the bend-fatigue strengths of the weld w and of the material is the same with the ratio $\sigma w/\sigma$ between the bending stress $\sigma$ of the shoulder 2c and the bending stress $\sigma w$ of the weld w.

Figure 5:
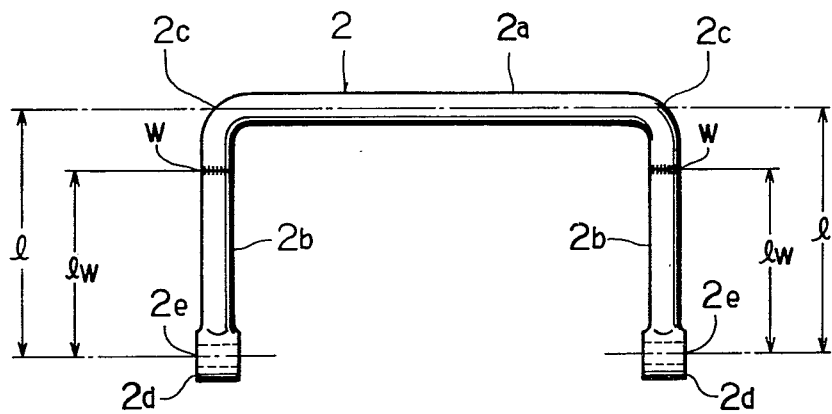
FIG. 5 is a front elevational view of the stabilizer having arms welded thereto at determined locations thereof.

Accordingly the stabilizer 2 as shown in FIG. 5 has the welds w provided, respectively, at a position which is determined in such a manner that the distance lw from the center axis 2e of the eye-termination 2d becomes lw=0.76l. Thus if the bending stress $\sigma$ is produced at the shoulders 2c each connecting the base 2a to each of the arms 2b, the bending stress $\sigma w$ produced at the welds w will be $\sigma w = 0.76\sigma$ which is of the same bend-fatigue strength as that of the shoulders 2c of the material.

Figure 6:
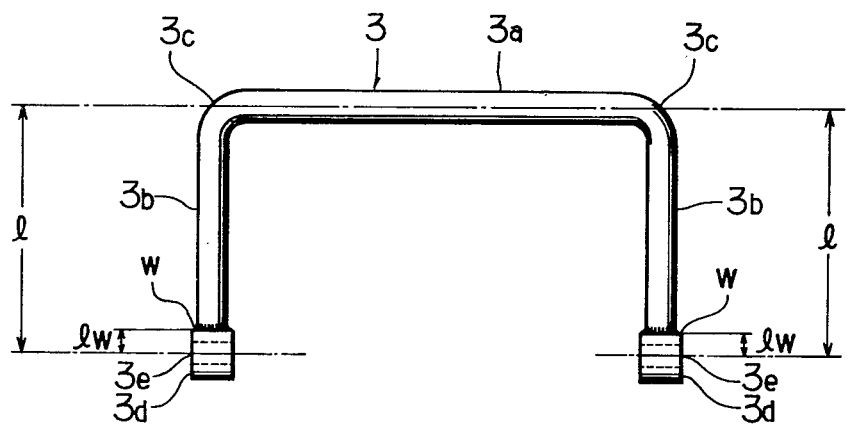
FIG. 6 is a front elevational view showing another embodiment of the stabilizer according to the invention.

Another embodiment of stabilizer 3 according to the invention as shown in FIG. 6 has the welded parts w provided at the roots of eye-terminations 3d, respectively, each satisfying the condition of distance lw≤0.76l. This design permits more convenient manufacture of the eye-terminations 3d.

The foregoing structures of the stabilizer are adapted to the same kind of materials on both sides of the weld w and to the same diameter thereof.

In case the steels in which different kinds of components are used on both sides of the weld w, it has been found, as the result of experiment, that the ratio is 0.38 between the bend-fatigue strength of the material and that of the weld w. Provided that the bending stress is $\sigma$ at the shoulders 2c or 3c and the bending stress is $\sigma w$ at the weld w, it becomes necessary to locate the weld w at the position satisfying a condition $\sigma w \leq 0.38\sigma$. It is therefore necessary in this case to locate the weld w at the position satisfying the condition lw≤0.38l.

Figure 7:
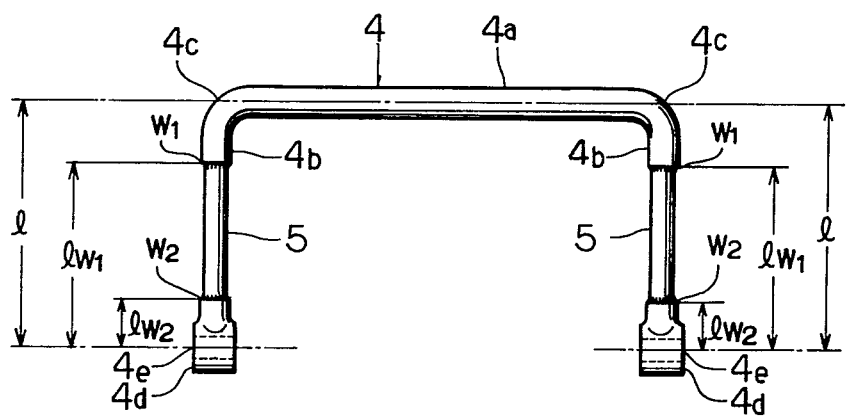
FIG. 7 is a front elevational view showing still another embodiment of the stabilizer according to the invention.

Still another embodiment of stabilizer 4 according to the invention as shown in FIG. 7 has welds $w_1$, $w_2$ provided in each of the arms 4b. The arm elements 5 between the two welds $W_1$ and $W_2$ are each of a diameter which is different from that of the base 4a and of each shoulder 4c so as to vary the spring constant of the stabilizer As shown, axis 4e is the center axis of eye-terminations 4d, and $lw_1$, $lw_2$ and l are distances respectively from the center axis 4e of 4d to the weld $w_1$, $w_2$ and the shoulder 4c.

The method for producing the welds w in this specification includes any welding method that will accomplish the result including electric resistance welding fusion welding such as electrode welding, friction pressure welding, etc.

The ordinary stabilizer is generally heat treated. The stabilizer of the invention may be heat treated before or after it is welded.

With the foregoing structure of the stabilizer according to the invention, the stabilizer is produced as follows; With respect to the stabilizer 2 as shown in FIG. 5, the first part is first forged in a mold to form up the base 2a and the shoulders 2c. Another part is separately forged in a mold to form up the arm 2b and the eye-termination 2d forging, and the eye-termination 2d manufacture is completed by a machine tool. Then the arm 2b is welded to the base 2a with the weld w. In this case, the manufacture of the eye-termination 2d may be easily accomplished by dealing only with the arm 2b, instead of dealing with the stabilizer itself, and, accordingly, the manufacturing precision is heightened. This is also the same with respect to the base 2a and the shoulders 2c. The foregoing operation is relatively convenient to perform.

Operation is as follows; With respect to the fatigue strength of the stabilizer 2 when it is actually used in a vehicle, the weld w is provided at the position corresponding to lw=0.76l with the effect that the weld w has the bending stress $\sigma w = 0.76\sigma$ in relation to the bending stress $\sigma$ at the shoulder 2c. This implies that only 76% of the maximum bending stress is effected at the weld w. Accordingly, the bend-fatigue strength of the weld w is even with that of the shoulder 2c. It is therefore apparent that there is no reduction of bend-fatigue strength of the stabilizer 2 in spite of the existence of the weld w.

With respect to the embodiment as shown in FIG. 6, the eye-termination 3d is individually manufactured from steel pipe or the ordinary bearing metal, and then is welded to the arm 3d. The eye-termination 3d may be more easily manufactured with the required precision and also by means of a small sized machine tool. In view of the extremely short distance lw, the bending stress $\sigma w$ is approximately zero in comparison with the bending stress $\sigma$. The weld part w has therefore no problem with respect to the bend-fatigue strength thereof.

With respect to the embodiment as shown in FIG. 7, the stabilizer 4 has the base 4a, shoulder 4c and a part of arm 4b integrally formed up from the same material, and the other part 5 of arm, which is of the a smaller diameter, is welded to the stabilizer. As shown, the weld $w_1$ is at the position with the distance $lw_1$ and the weld $w_2$ is at the position with the distance $lw_2$, and the distances l, $lw_1$ are determined to satisfy the condition $lw_1 = 0.76l$. The stabilizer 4 has therefore no problem as to the bend-fatigue strength and is capable of varying the spring property such as the spring constant. Thus the stabilizer 4 may heighten the ride feeling or comfort of a vehicle which may not be attained by the conventional stabilizer 1. Since the stabilizer 4 is divided into a number of parts, it is more easily manufactured by means of a small sized machine tool.

Further according to the invention, it is free to do first any of the bending operation and the welding operation during production of the stabilizer 2, 3 and 4 as shown in FIGS. 5 to 7.

It may be possible to form up the stabilizer 2, 3 or 4 with different kinds of metals each specific to the base 2a, 3a or 4a and to the arm 2b, 3b or 4b. In this case, there is no problem with respect to the strength of the stabilizer if the weld w is provided at a position satisfying the condition $lw \leq 0.38l$. This would provide a stabilizer of relatively less weight as well as possessing excellent corrosion resistance.

What is claimed is:

1. A stabilizer having a base for receiving a torsion moment, arms for connection to a load, shoulders connecting the base to each of the arms and eye-terminations provided on the respective ends of the arms to connect the stabilizer to a load, said stabilizer comprising a weld provided at each of the arms and connecting each of the arms integrally thereat to the base said weld being located in a region between each of the eye-terminations and a position on each of the arms where a ratio between the bend-fatigue strength of the material forming the stabilizer and that of the weld is approximately equal with a ratio between the bending stress of each shoulder and that of the weld.

2. A stabilizer as defined in claim 1, where in each of the arms is made of the same kind of material on both sides of the weld.

3. A stabilizer as defined in claim 2, where in the weld is located at a position satisfying the condition $\sigma w/\sigma \leq 0.76$, provided that each of the shoulders and the weld are of the same diameter, and wherein $\sigma$ is the bending stress at each of the shoulders and $\sigma w$ is the bending stress at the weld.

4. A stabilizer as defined in claim 1, wherein each of the arms is made of a steel of a different kind of component on both sides of the weld.

5. A stabilizer as defined in claim 4, where the weld is located at a position satisfying the condition $\sigma w/\sigma \leq 0.38$, provided that each of the shoulders and the weld are of the same diameter, and wherein $\sigma$ is the bending stress at each of the shoulders and $\sigma w$ is the bending stress at the weld.

6. A stabilizer as defined in claims 1, 2 or 4 wherein each of the arms is of different diameters on both sides of the weld.

7. A stabilizer having a base for receiving a torsion moment, shoulders formed at opposite ends of the base, arms having eye-terminations formed at the respective remote ends thereof for connection to a load, a weld integrally joining the respective arms to the respective shoulders, the shoulders and the welds being of the same diameter, each respective weld located at a position where the ratio of the bending stress $\sigma w$ at the weld and the bending stress $\sigma$ at each of the shoulders satisfies the condition $\sigma w/\sigma \leq 0.76$.

* * * * *